March 3, 1953  C. G. LONG  2,630,330
CONTROL ARM ADJUSTING DEVICE FOR WHEEL SUSPENSIONS
Filed April 19, 1948
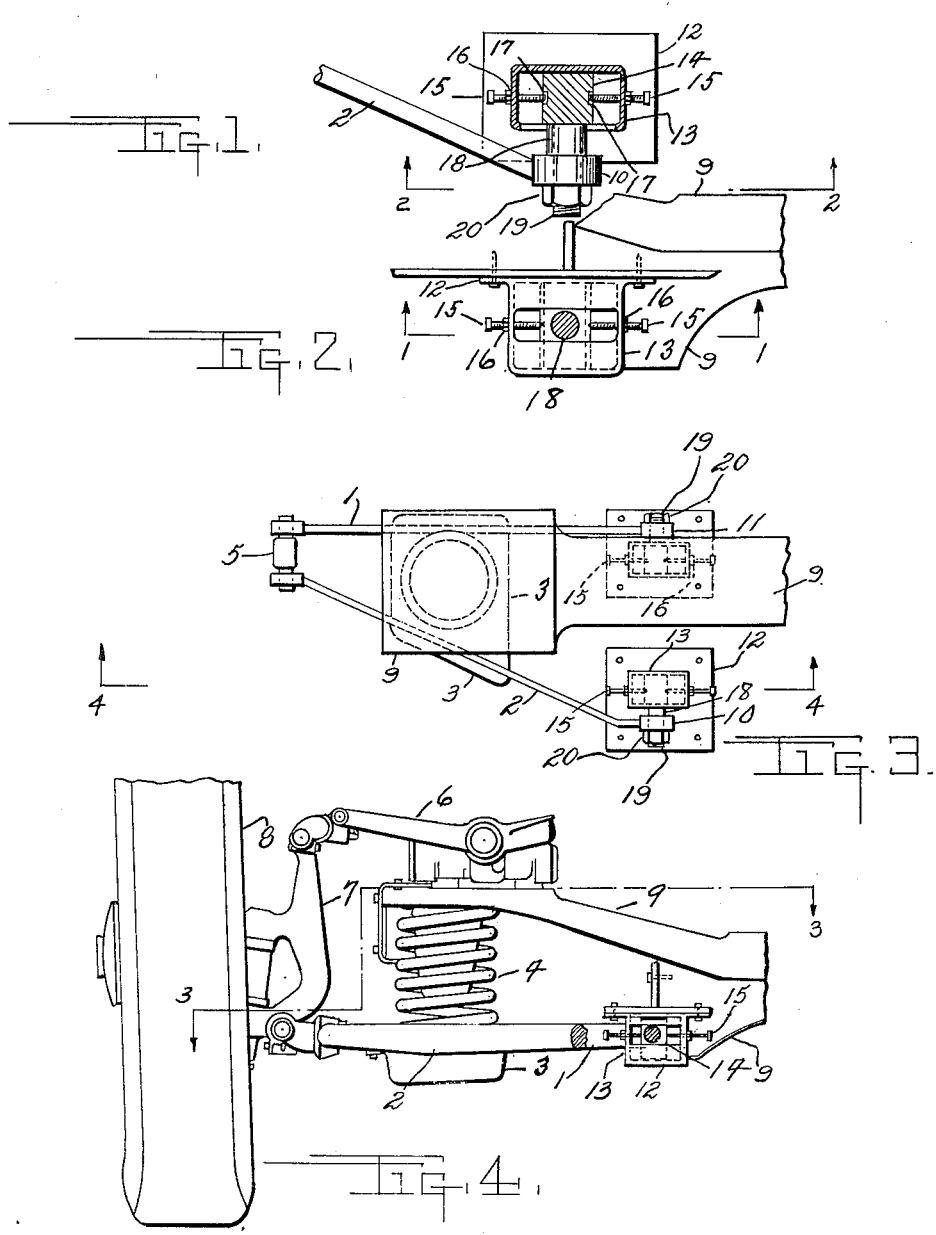
Crawford G. Long
INVENTOR.
BY Chas. Denegre
Attorney.

Patented Mar. 3, 1953

2,630,330

UNITED STATES PATENT OFFICE 2,630,330

CONTROL ARM ADJUSTING DEVICE FOR WHEEL SUSPENSIONS

Crawford G. Long, Birmingham, Ala., assignor of one-half to U. G. Ingle, Sr., Jesup, Ga.

Application April 19, 1948, Serial No. 21,923

1 Claim. (Cl. 280—96.2)

This invention relates to automobile suspension mechanism. It has for its main object to provide adjusting means in connection with the axle or frame and wheels of an automobile. Further objects are to provide such means that will be highly satisfactory for the purpose intended, simple in structure, comparatively cheap to manufacture, and extremely durable. Other objects and advantages will appear from the drawing and description.

At the present time many automobiles are provided with coil springs in the front wheels supporting structure that comprises as component parts a pair of rods for each front wheel that extend horizontally from the wheel spindle assembly to the under portion of the frame or front axle. The inner end of each rod is provided with an eye that fits upon a stud bolt on which it is swingable sufficiently to accommodate the action of the spring to thus provide what is commonly called knee action. When the wheel supporting mechanism becomes worn allowing the wheel to get out of line the only remedy is to replace the worn parts at considerable expense. The present invention is for the purpose of providing simple and effective means for aligning each wheel without the cost and necessity of installing new parts.

By referring generally to the drawing, part of this application, it will be observed that Fig. 1 is a horizontal view on line 1—1 of Fig. 2 showing part of the adjusting means; Fig. 2 is a perpendicular view on line 2—2 of Fig. 1 showing the same part of the adjusting means; Fig. 3 is a horizontal view on line 3—3 of Fig. 4 showing the two parts of the adjusting means; and Fig. 4 is a perpendicular view showing the assembled mechanism for one wheel and the wheel and the improved feature partly in section as it would appear on line 4—4 of Fig. 3.

Similar reference numerals refer to similar parts throughout the several views.

Referring to the drawing in detail it will be seen that a regular type of automobile front wheel suspension system with reference to a front axle or frame is indicated by parts 1, 2, 3, 4, 5, 6, 7 and the wheel 8. These members are no part of the present invention that comprises the improved means of attaching the rods 1 and 2 to the axle or frame 9. In the standard type now in general use the ends 10 and 11 of the rods 1 and 2 are attached to fixed studs or bolts in rigid contact with the axle or frame 9. In the present improved connecting means base plates 12 are attached by any suitable bolts to the axle or frame for supporting brackets or frames 13 in which are mounted slidable blocks 14 that are held in position by bolts 15 with jam nuts 16. The blocks are provided with slots 17 into which the inner ends of the bolts fit. The blocks are provided with integral extensions 18 in the form of studs with threads 19 on their outer ends for the accommodation of nuts 20 for holding the ends of the rods 1 and 2 swingable on the studs in the same manner as the standard structure.

From the foregoing it will appear that each slidable block can be moved within its containing bracket without disturbing the other block. As a result the shaft 5 that is the lower member of the wheel supporting assembly may be adjusted inward or outward at both ends of the shaft 5, or one end may be drawn and set toward the center of the car with the other end pushed outward and set. Thus by use of the sliding joints the front wheels of an automobile can be properly set if they are out of line as a result of wear of the supporting structure.

The sliding blocks and companion parts may be made of any metal suitable for the purpose, but I prefer to use steel; also may be made in various sizes for use on trucks and automobiles of different sizes and capacities.

While I have shown and described the preferred embodiment of my invention, I do not wish to limit same to the exact and precise details of structure, but reserve the right to make all modifications and changes so long as they remain within the spirit and scope of the following claim.

Having described my invention I claim:

A pair of wheel suspensions, one for each side of the front axle of an automobile, each suspension comprising a plurality of vertically spaced suspension arms pivoted at one end to said axle and pivoted at the other end to a wheel carrying spindle member, the pivotal connection of at least one of said arms to said axle comprising two square-shaped metal brackets attached under and near the transverse center portion of the axle, each of said brackets having two depending spaced side walls, a cross floor portion integral with the lower end of each of said walls and spanning the space therebetween, a metal block of rectangular cross-section mounted between said side walls and with its entire bottom face slidable on said cross floor, two opposite sides of said block having a groove in each positioned parallel with the bracket floor, a threaded hole in each of said walls and aligned with the corresponding groove in said block, a cap type bolt threaded in each of said last named holes, the inner end of each of said bolts being positioned in the corresponding groove of the block opposite each other, a jam nut on each bolt; an integral extension on said block and forming a stud shaft with screw threads in its outer end portion, a nut threaded on said last named screw threads, at least one of said suspension arms having an eye integral therewith and in the axle end thereof, said stud shaft being inserted through the eye and being retained in said arm by said last named nut.

CRAWFORD G. LONG.

REFERENCES CITED

The following references are of record in the file of this patent:

UNITED STATES PATENTS

| Number | Name | Date |
| --- | --- | --- |
| 1,706,232 | Hurxthal | Mar. 19, 1929 |
| 2,299,087 | Goetz | Oct. 20, 1942 |